(12) United States Patent
A et al.

(10) Patent No.: US 10,277,461 B1
(45) Date of Patent: Apr. 30, 2019

(54) GENERATING NETWORK SERVICE MODELS

(71) Applicant: Juniper Networks, Inc., Sunnyvale, CA (US)

(72) Inventors: Chandrasekhar A, Bangalore (IN); Nirmal Anburose, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 422 days.

(21) Appl. No.: 15/133,743

(22) Filed: Apr. 20, 2016

(51) Int. Cl.
*G06F 15/177* (2006.01)
*H04L 12/24* (2006.01)

(52) U.S. Cl.
CPC ...... *H04L 41/0823* (2013.01); *H04L 41/0816* (2013.01); *H04L 41/22* (2013.01)

(58) Field of Classification Search
CPC ...... H04L 63/10; H04L 41/022; H04L 41/085
See application file for complete search history.

(56) References Cited

U.S. PATENT DOCUMENTS

| | | | | |
|---|---|---|---|---|
| 2010/0023608 | A1* | 1/2010 | Hanano | G06F 17/30017 709/221 |
| 2012/0191826 | A1* | 7/2012 | Gotesdyner | H04L 12/6418 709/221 |
| 2013/0151674 | A1* | 6/2013 | Weeks | H04L 41/5006 709/220 |
| 2017/0064122 | A1* | 3/2017 | Nakahara | H04N 1/00928 |
| 2017/0277731 | A1* | 9/2017 | Melamed | G06F 17/30303 |

OTHER PUBLICATIONS

Wikipedia, "NETCONF," https://en.wikipedia.org/wiki/NETCONF, Mar. 30, 2016, 5 pages.
Wikipedia, "YANG," https://en.wikipedia.org/wiki/YANG, Mar. 21, 2016, 5 pages.

* cited by examiner

*Primary Examiner* — Yves Dalencourt
(74) *Attorney, Agent, or Firm* — Harrity & Harrity, LLP

(57) ABSTRACT

A system may receive network device configuration information associated with a network service. The system may determine multiple settings associated with the network service based on receiving the network device configuration information. The multiple settings may include a common setting and a device-specific setting. The system may generate a first network service model of the network service based on the multiple settings. The first network service model may include multiple nodes corresponding to the multiple settings. The system may re-configure one or more nodes associated with the first network service model, and may generate a second network service model of the network service. The system may generate a user interface template based on the second network service model and may provide the user interface template to a client device for display. The client device may allow a configuration of the multiple settings based on the user interface template.

20 Claims, 14 Drawing Sheets

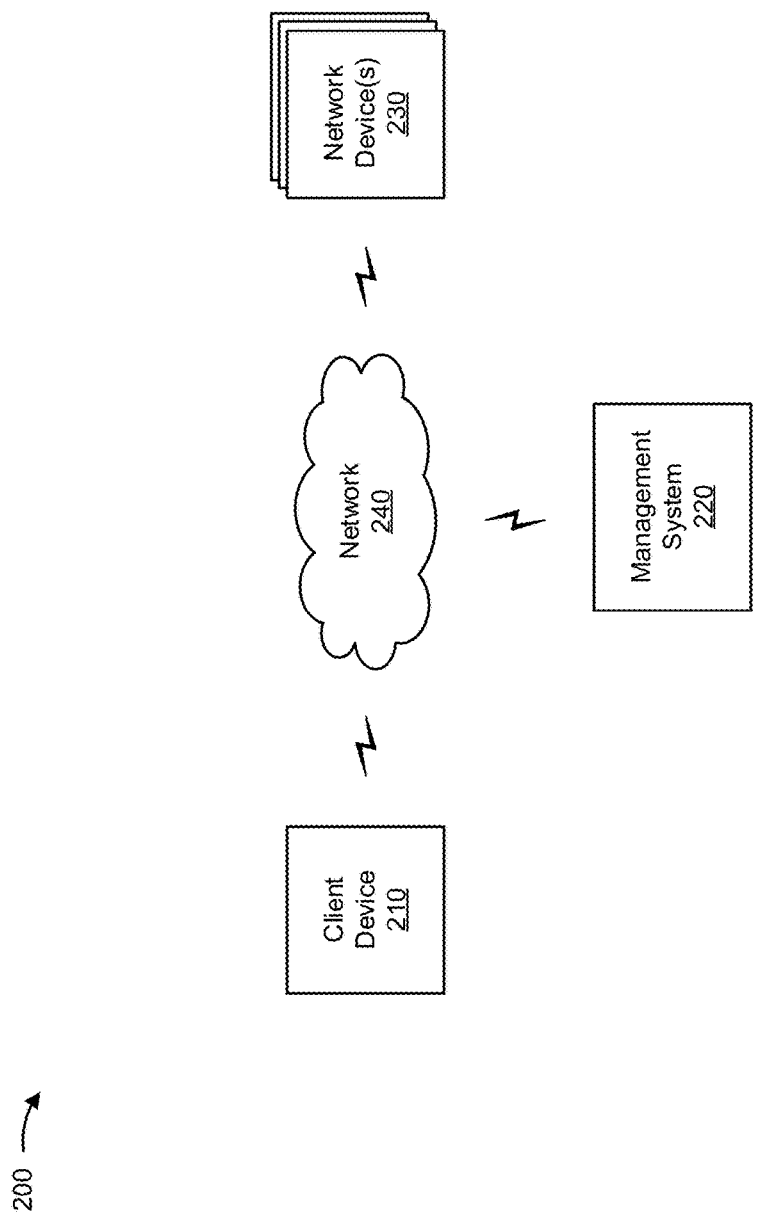

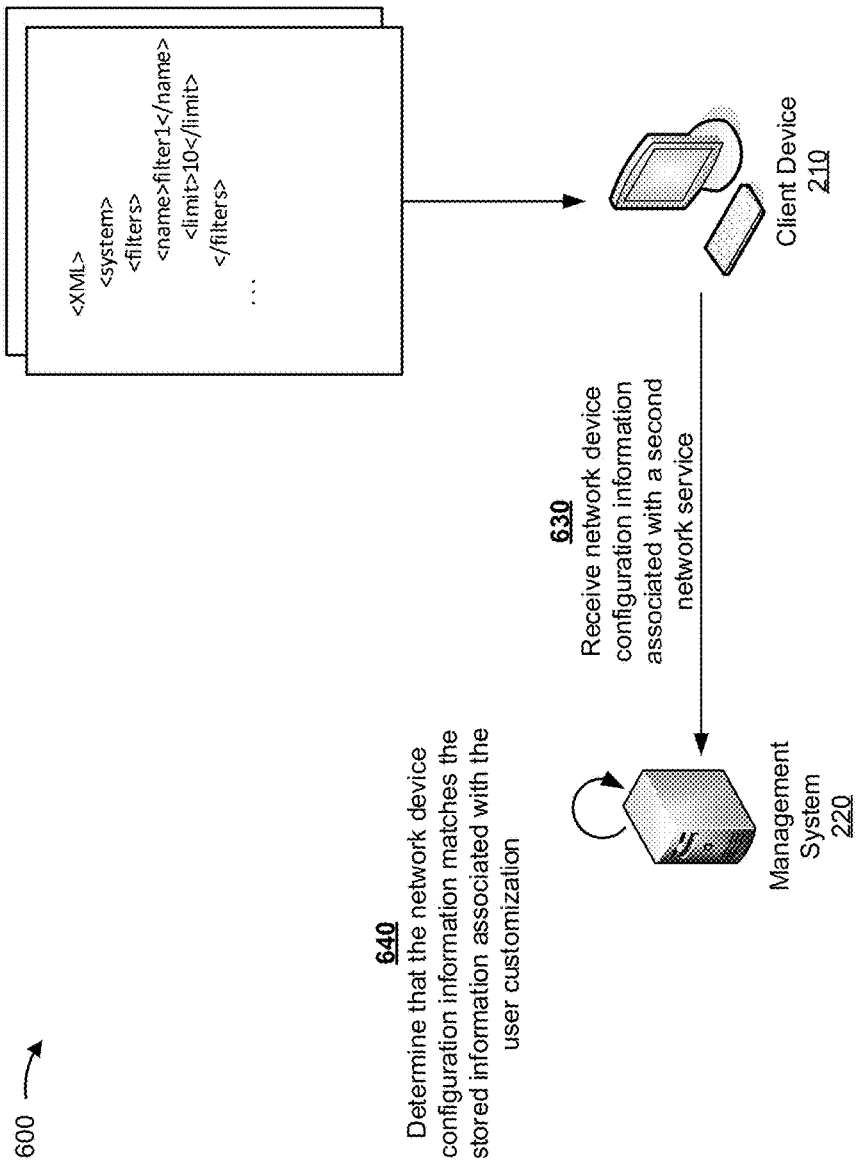

GENERATING NETWORK SERVICE MODELS

BACKGROUND

The Network Configuration Protocol ("NETCONF") provides mechanisms to install, manipulate, and delete the configuration of network devices. The Yet Another Next Generation ("YANG") modelling language is a data modelling language for the NETCONF protocol, and represents data structures in an Extensible Markup Language ("XML") tree format. A network management system may use YANG data models to provision network devices via the NETCONF protocol.

SUMMARY

In some implementations, a system may include one or more processors to receive network device configuration information associated with a network service. The one or more processors may determine multiple settings associated with the network service based on receiving the network device configuration information. The multiple settings may include a common setting and a device-specific setting. The one or more processors may generate a first network service model of the network service based on the multiple settings. The first network service model may include multiple nodes corresponding to the multiple settings. The one or more processors may re-configure one or more nodes associated with the first network service model. The one or more processors may generate a second network service model of the network service based on re-configuring the one or more nodes. The one or more processors may generate a user interface template based on the second network service model. The one or more processors may provide the user interface template to a client device for display. The client device may allow configuration of the multiple settings based on the user interface template.

In some implementations, a non-transitory computer-readable medium may store one or more instructions that, when executed by one or more processors, cause the one or more processors to receive network device configuration information associated with a network service. The one or more instructions may cause the one or more processors to determine multiple settings based on the network device configuration information. The multiple settings may include device-specific settings and common settings. The one or more instructions may cause the one or more processors to generate a first network service model based on determining the multiple settings. The first network service model may include multiple nodes corresponding to the multiple settings. The one or more instructions may cause the one or more processors to generate a second network service model based on re-configuring one or more nodes of the multiple nodes of the first network service model. The one or more instructions may cause the one or more processors to generate a user interface template based on the second network service model. The one or more instructions may cause the one or more processors to provide the user interface template.

In some implementations, a method may include receiving configuration information associated with a network service. The method may include determining multiple settings based on the configuration information. The multiple settings may include common settings that are common for a plurality of network devices, and device-specific settings that differ for one or more of the plurality of network devices. The method may include generating a first network service model based on determining the multiple settings. The first network service model may include multiple nodes corresponding to the multiple settings. The method may include generating a second network service model based on re-configuring one or more nodes of the multiple nodes. The method may include generating a user interface template based on the second network service model. The method may include providing the user interface template to allow a configuration of the multiple settings based on the user interface template.

BRIEF DESCRIPTION OF THE DRAWINGS

FIG. 2 is a diagram of an example environment in which systems and/or methods, described herein, may be implemented;

FIGS. 6A-6C are diagrams of an example implementation relating to the example process shown in FIG. 5.

DETAILED DESCRIPTION

The following detailed description of example implementations refers to the accompanying drawings. The same reference numbers in different drawings may identify the same or similar elements.

A network management system may allow a user (e.g., a network administrator) to configure network services (e.g., peer-to-peer ("P2P") services and/or virtual private network ("VPN") services). For example, the network management system may implement the NETCONF protocol to allow the user to install, manipulate, and delete configurations of network devices that may support a network service. However, a network management system may not support particular network services. For example, the network management system may support a finite quantity of network services. Thus, if a user desires to use the network management system in association with a new and/or customized service (e.g., an unsupported service), then the user may be required to define a model associated with the network service, define how the model may be translated to network device configurations (e.g., deployed into the network), or the like. To do so, the user may be required to have a deep understanding of modelling languages, transformation languages, device configurations, device schemas, or the like.

Implementations described herein may assist a user and/or a management system in generating a network service model to be used in association with a network management system. Implementations described herein may enable a management system to automatically generate a network service model, generate a mapping between the network service model and a network device configuration, and generate a user interface template that may allow a user to configure the network service. By reducing the need for a user to model a network service, implementations described herein may conserve processor and/or memory resources. Additionally, implementations described herein may reduce a quantity of errors associated with modelling the network service, thereby conserving processor and/or memory resources of a management system and network devices and may additionally conserve network resources.

Figure 1A:
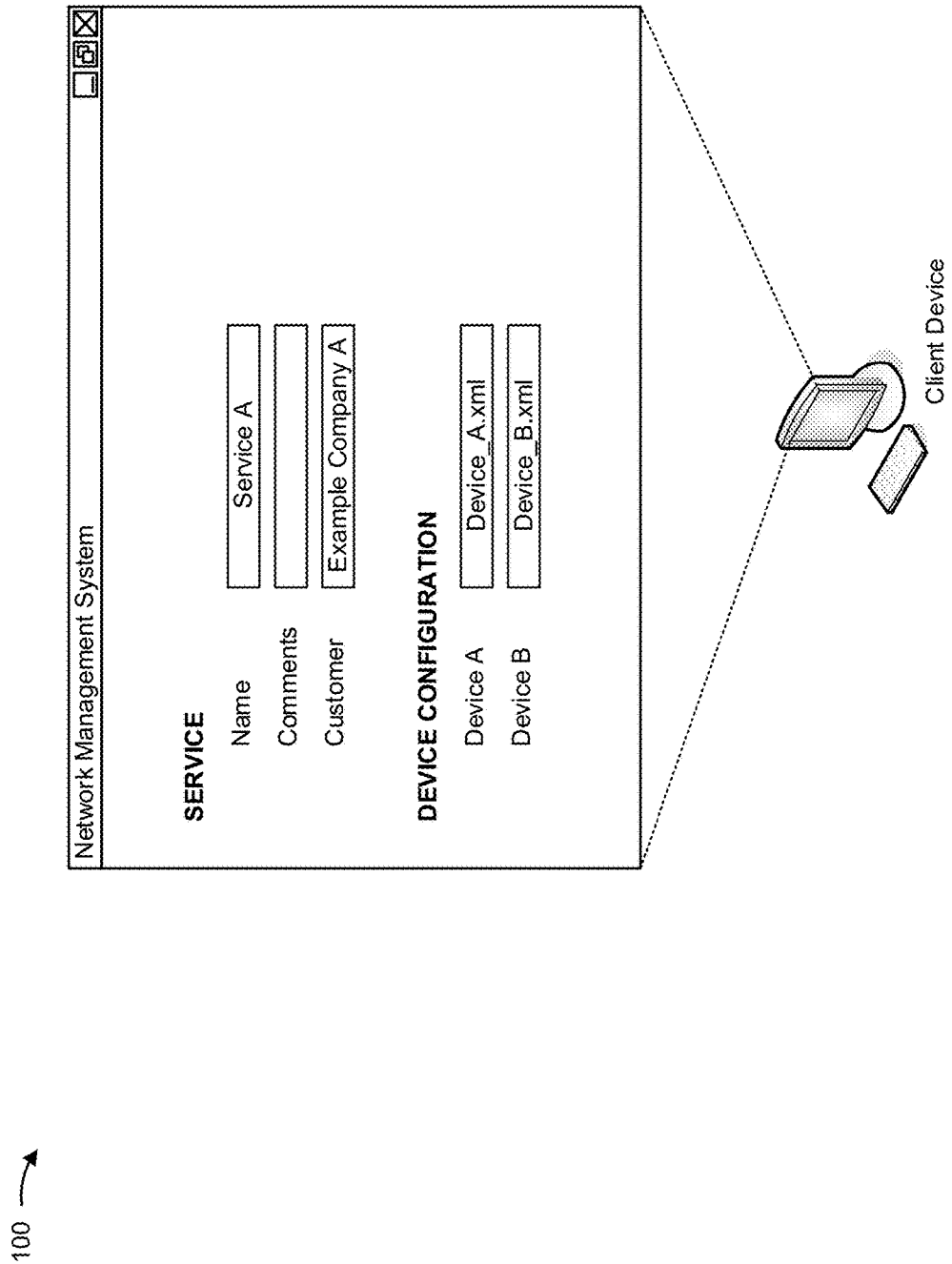
FIGS. 1A-1G are diagrams of an overview of an example implementation described herein.

FIGS. 1A-1G are diagrams of an overview of an example implementation 100 described herein. As shown in FIG. 1A, a user (e.g., a network administrator) may interact with a client device (e.g., a desktop computer) while using a network management system to configure network devices. For example, assume that the network management system does not initially support a particular network service (e.g., "Service A"). The user may upload device configuration information (e.g., XML files) associated with two network devices (e.g., "Device A" and "Device B") that are configured to support the network service (e.g., "Service A").

Figure 1B:
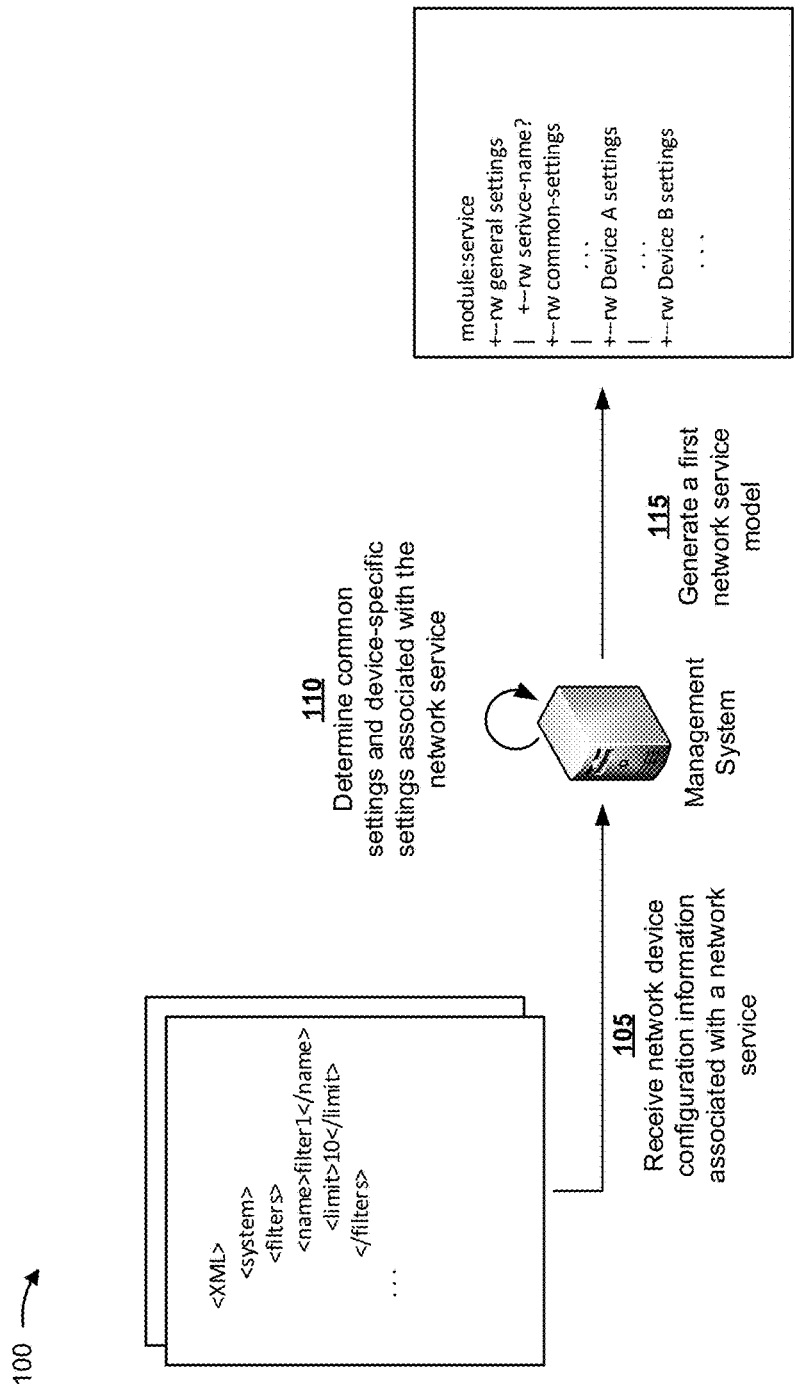

As shown in FIG. 1B, and by reference number 105, a management system (e.g., one or more server devices) may receive network device configuration information associated with a network service. For example, the management system may receive, from the client device, the network device configuration information associated with the network service (e.g., "Service A"). As shown by reference number 110, the management system may determine common settings and device-specific settings associated with the network service. For example, a common setting may include a setting that includes the same value for both network devices (e.g., "Device A" and "Device B"). Additionally, a device-specific setting may include a setting that includes different values between the network devices (e.g., "Device A" and "Device B" may include different values for the setting).

The management system may determine a common setting and/or a device-specific setting based on parsing the device configuration information and identifying XML Path Language expressions (e.g., "XPaths") that include the same node values or include different node values, as described in more detail elsewhere herein. As further shown in FIG. 1B, and by reference number 115, the management system may generate a first network service model based on determining the common settings and the device-specific settings associated with the network service. For example, the management system may generate a first network service model (e.g., a YANG model) that includes common settings under a container node, and device-specific settings under one or more container nodes associated with the respective network devices.

The management system may store information that identifies a mapping between an XPath associated with the network device configuration information and an XPath associated with the first network service model. In this way, the management system may provision a network device based on a value associated with the first network service model, as described elsewhere herein.

Figure 1C:
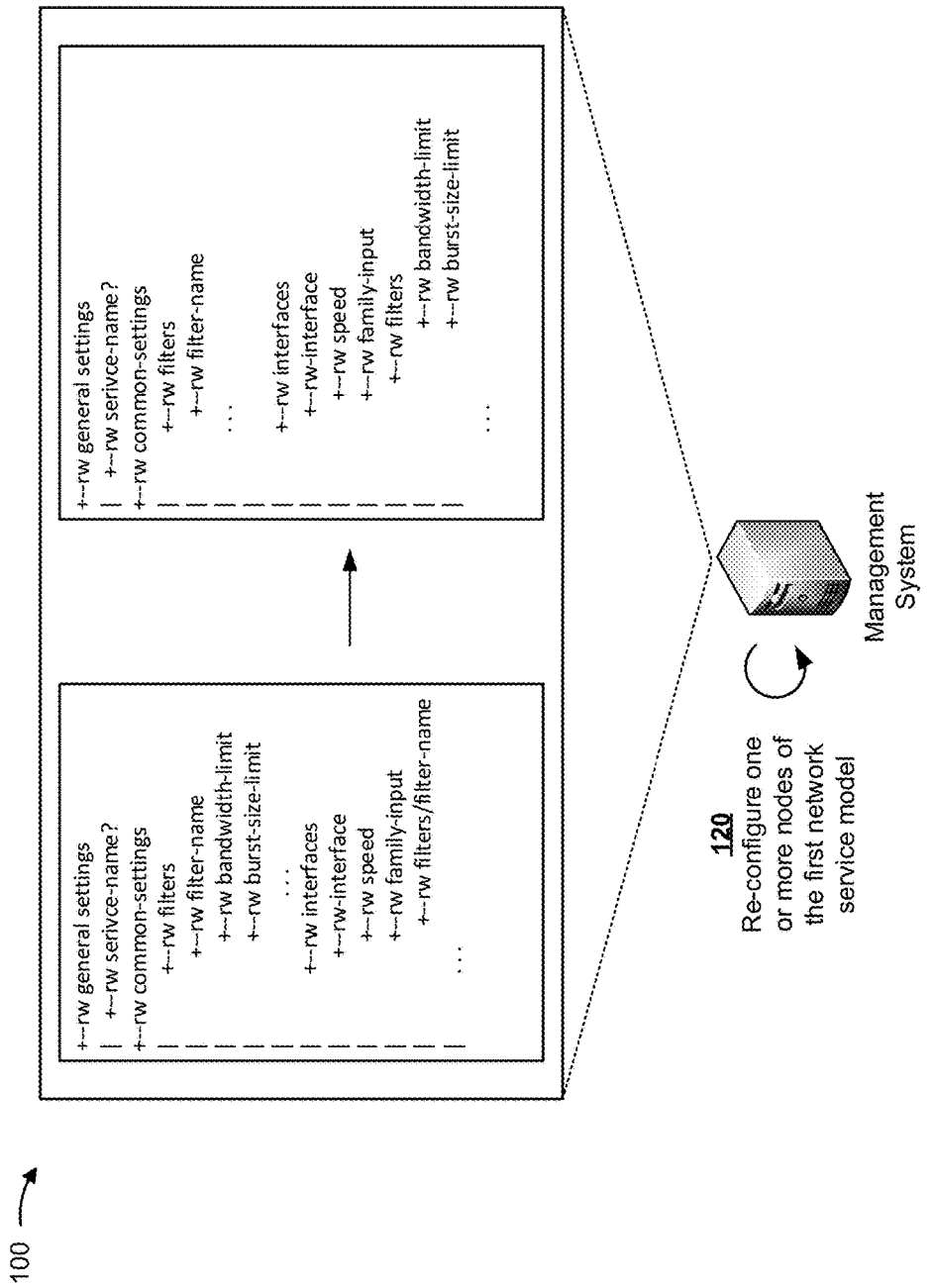

As shown in FIG. 1C, and by reference number 120, the management system may re-configure one or more nodes of the first network service model. For example, the management system may re-configure one or more nodes of the first network service model based on re-configuring a parent node, of a referenced node, to be a child node of the referring node (e.g., a "leafref" node), as described in more detail elsewhere herein.

Figure 1D:
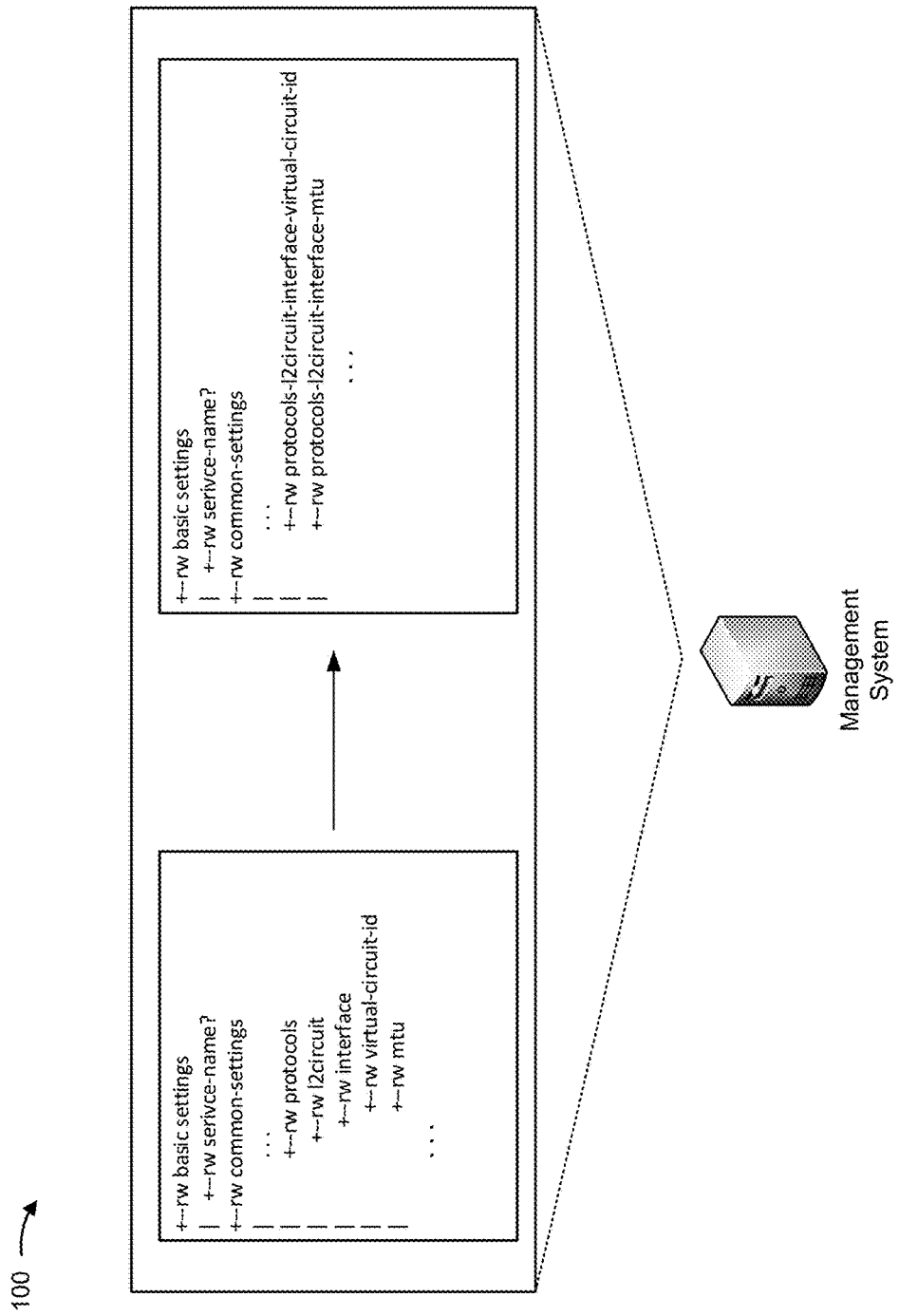

As shown in FIG. 1D, the management system may further re-configure one or more nodes of the first network service model based on flattening one or more nodes. For example, the management system may identify a parent node that includes a child node that is a container node. Additionally, the management system may move one or more sub-child nodes under the parent node and may remove the child node. Additionally, the management system may rename the parent node. In this way, the management system may simplify the first network service model by re-configuring the one or more nodes.

Figure 1E:
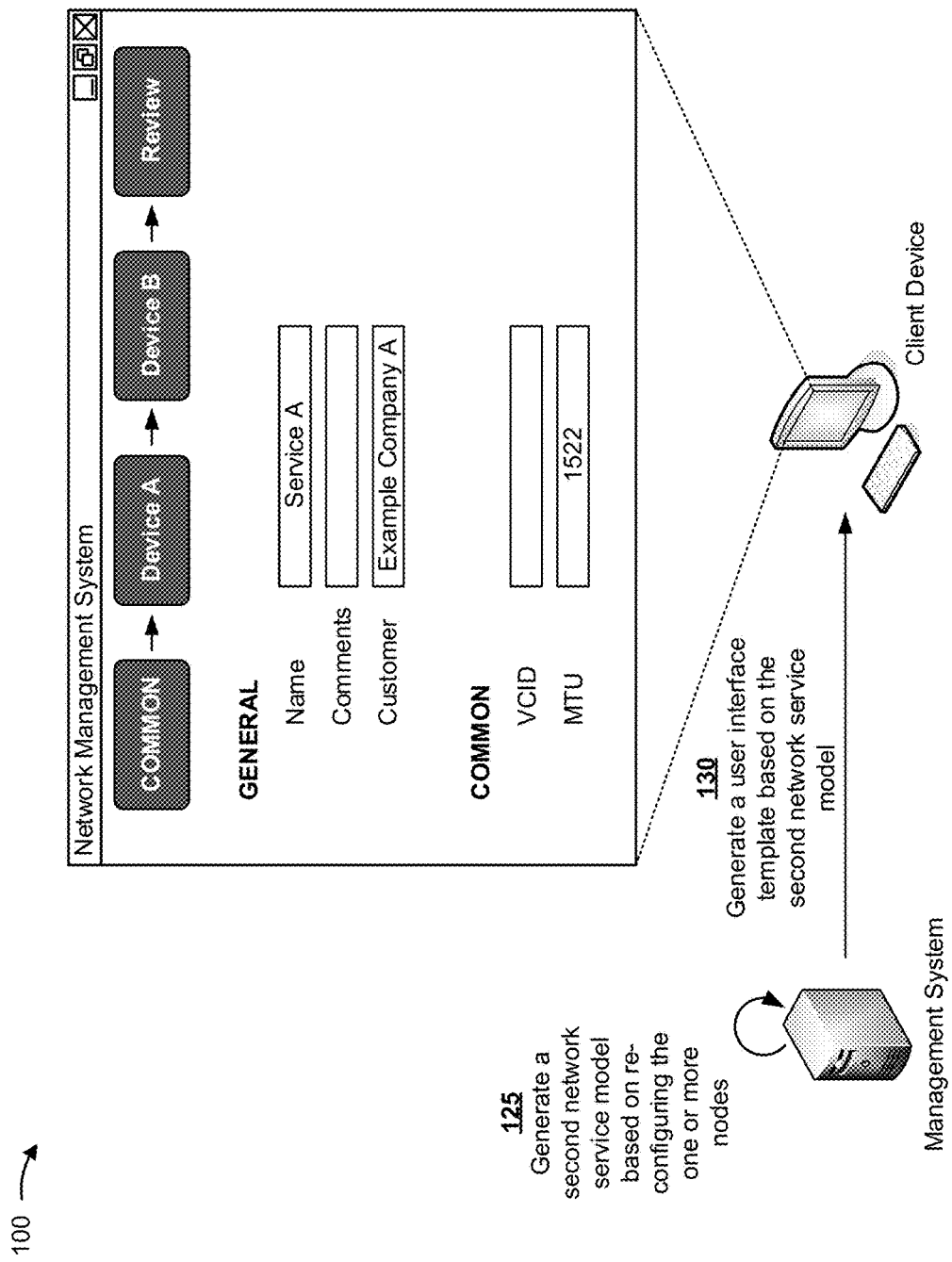

As shown in FIG. 1E, and by reference number 125, the management system may generate a second network service model based on re-configuring the one or more nodes of the first network service model. In some implementations, the management system may update stored information (e.g., information that identifies a mapping between an XPath associated with the network device configuration information and an XPath associated with the first network service model) based on re-configuring the one or more nodes. In this way, the management system may provision the network devices based on settings associated with the second network service model.

As shown by reference number 130, the management system may generate a user interface template based on the second network service model. For example, the user interface template may define a layout associated with a user interface, may define particular user interface elements to be provided via a user interface, or the like. The management system may provide the user interface template to the client device, and the client device may provide a user interface for display. For example, a user may interact with the user interface of the client device to configure the network service (e.g., configure common settings and device-specific settings).

Figure 1F:
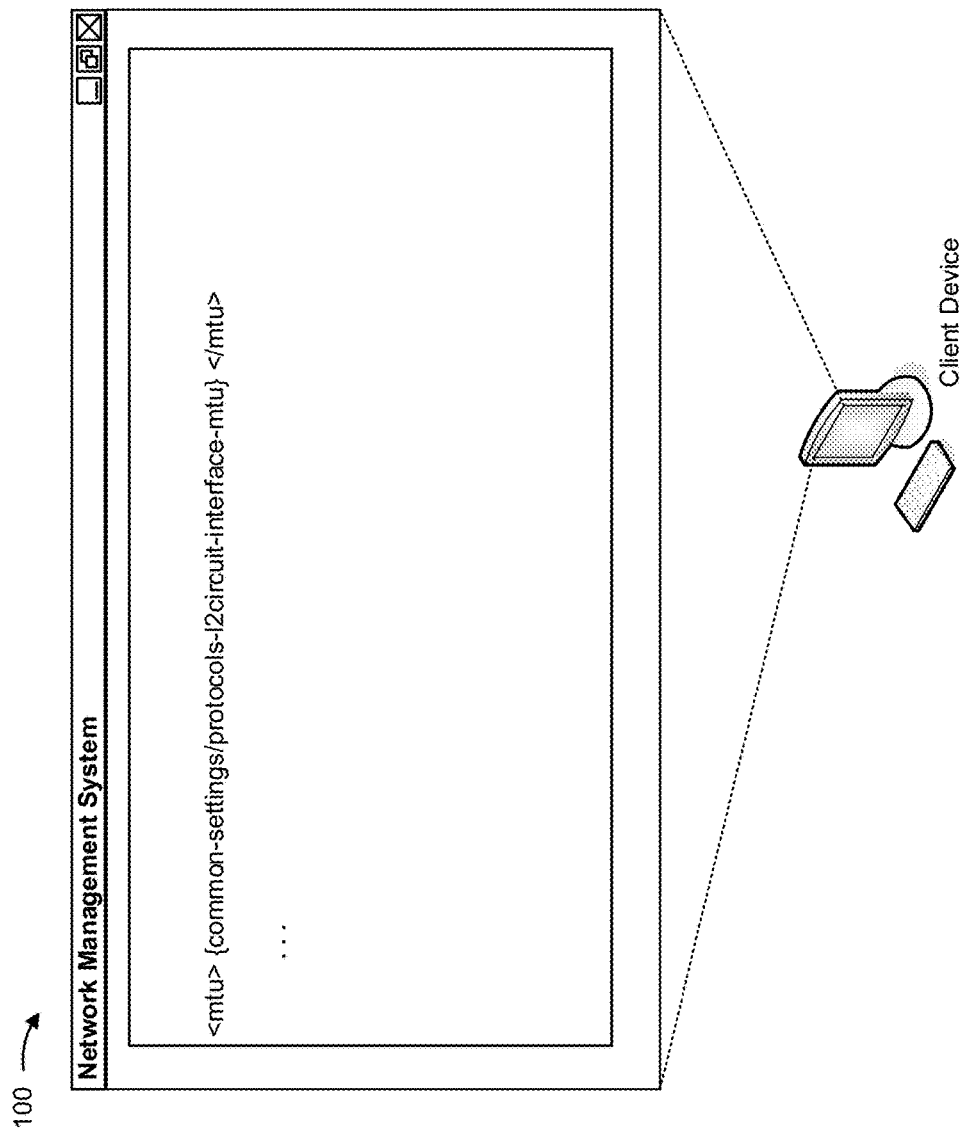

As shown in FIG. 1F, the client device may provide, for display, configuration information associated with a network device. For example, as shown, a particular XPath of the second network service model may be inserted into configuration information associated with a network device.

Figure 1G:
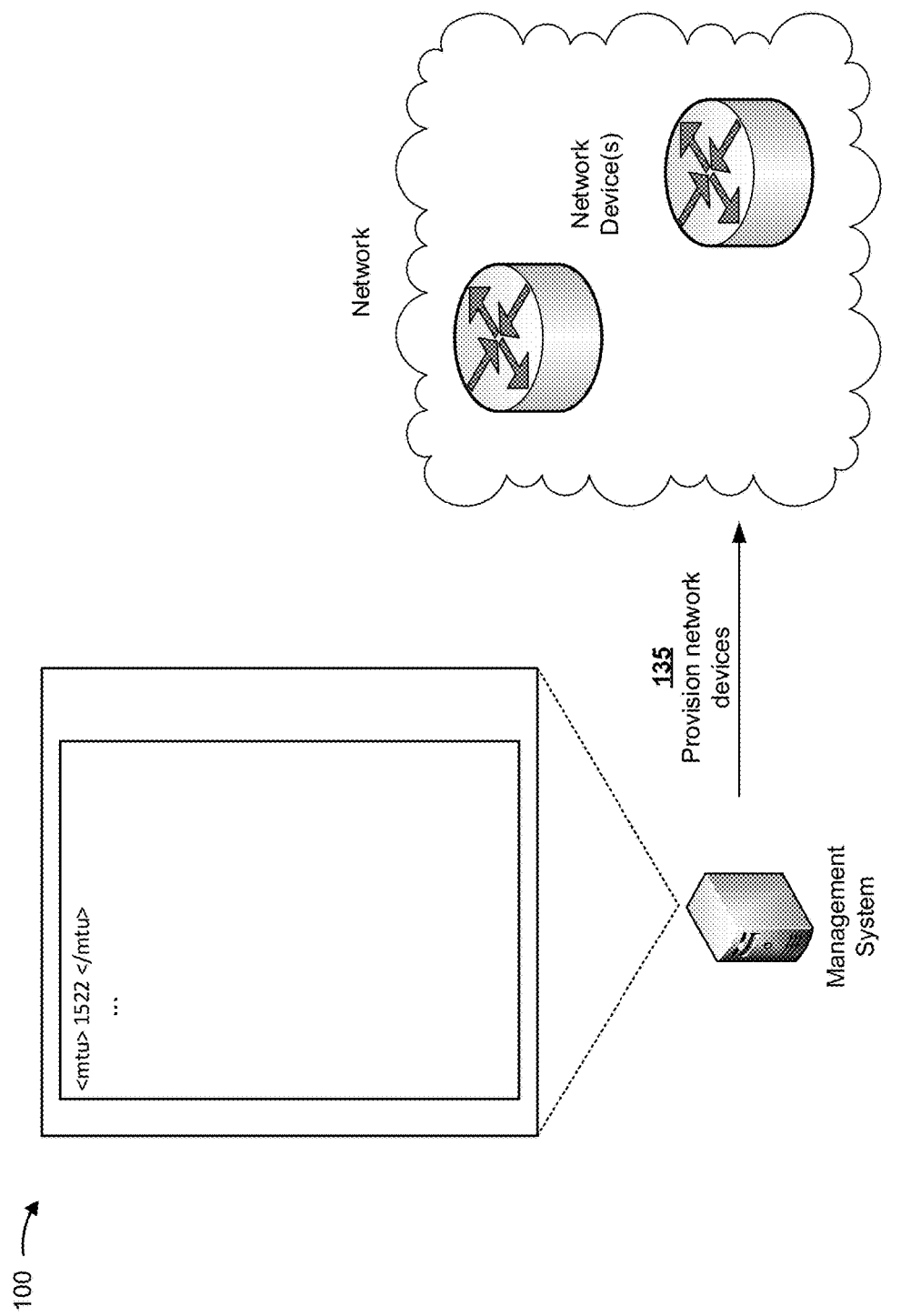

As shown in FIG. 1G, and by reference number 135, the management system may provision one or more network devices. For example, the management system may receive one or more setting values based on a user interaction with the client device, and may generate configuration information (e.g., XML files) based on the setting values. In this way, the management system may support configuration and/or re-configuration of network devices that are providing a network service.

Implementations described herein may enable a management system to automatically generate a network service model based on configuration information associated with network devices that are providing the network service. Additionally, implementations described herein may enable a network management system to automatically generate configuration information for the network devices based on the network service model. Implementations described herein may assist a user in generating a network service model without requiring that the user write code that defines the network service model. In this way, implementations described herein may reduce a quantity of errors associated with generating a network service model, and may reduce a quantity of errors associated with provisioning network devices. Thereby, implementations described herein may conserve processor and/or memory resources and may conserve network resources.

As indicated above, FIGS. 1A-1G are provided merely as an example. Other examples are possible and may differ from what was described with regard to FIGS. 1A-1G.

FIG. 2 is a diagram of an example environment 200 in which systems and/or methods, described herein, may be implemented. As shown in FIG. 2, environment 200 may include a client device 210, a management system 220, a set of network devices 230 (e.g., referred to collectively as "network devices 230" and individually as "network device 230"), and a network 240. Devices of environment 200 may interconnect via wired connections, wireless connections, or a combination of wired and wireless connections.

Client device 210 includes one or more devices capable of receiving, generating, storing, processing, and/or providing information associated with a network service. For example, client device 210 may include a computing device, such as a desktop computer, a laptop computer, a tablet computer, a server device, a mobile phone (e.g., a smart phone or a radiotelephone), or a similar type of device. In some implementations, client device 210 may provide a user interface via which a user may configure a network service.

Management system 220 includes one or more devices capable of receiving, generating, storing, processing, and/or providing information associated with generating a network service model and/or generating configuration information associated with network devices 230. For example, management system 220 may include a computing device, such as a server device (e.g., a cloud server, a content server, a web server, a host server, and/or a database server), or the like.

In some implementations, management system 220 may include a network service generation module. For example, the network service generation module may receive configuration information associated with network devices 230, and may generate a network service model. In some implementations, management system 220 may include a mapping generation module. For example, the mapping generation module may map a network service model to configuration information associated with network devices 230. In some implementations, management system 220 may include a user interface template generation module. For example, the template generation module may generate a user interface template, based on a network service model, that may be used by client device 210. In some implementations, management system 220 may include a learning module. For example, the learning module may receive information that identifies a user customization (e.g., a user configuration) of a network service model and may use a machine learning technique to generate other network service models based on the received information.

Network device 230 includes one or more devices capable of storing, processing, and/or routing information. For example, network device 230 may include a traffic transfer device, such as a router, a switch, a gateway, a modem, a firewall, a network interface card (NIC), a hub, a bridge, a server device, or any other type of device that processes and/or transfers traffic.

Network 240 may include one or more wired and/or wireless networks. For example, network 240 may include a cellular network (e.g., a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
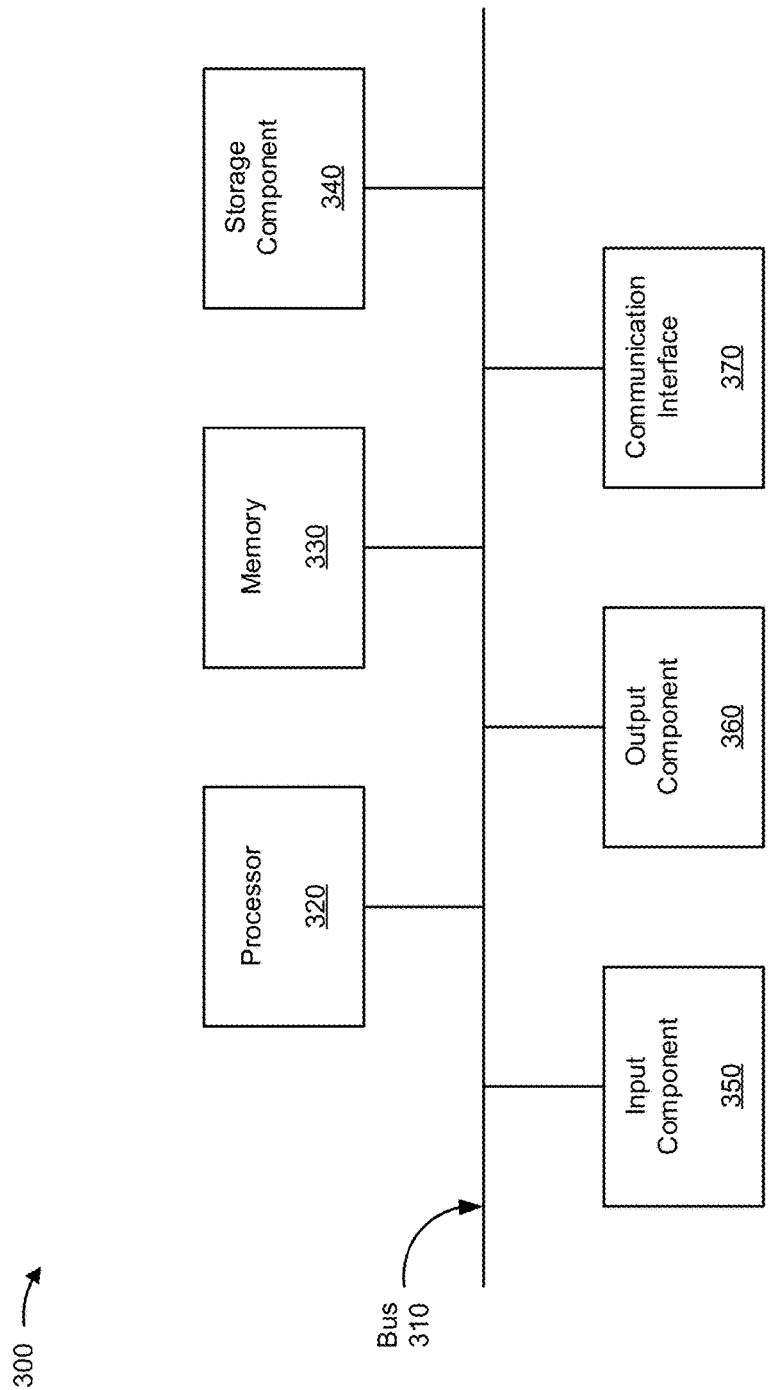
FIG. 3 is a diagram of example components of one or more devices of FIG. 2.

FIG. 3 is a diagram of example components of a device 300. Device 300 may correspond to client device 210, management system 220, and/or network device 230. In some implementations, client device 210, management system 220, and/or network device 230 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 includes a processor (e.g., a central processing unit (CPU), a graphics processing unit (GPU), and/or an accelerated processing unit (APU)), a microprocessor, a microcontroller, and/or any processing component (e.g., a field-programmable gate array (FPGA) and/or an application-specific integrated circuit (ASIC)) that interprets and/or executes instructions. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
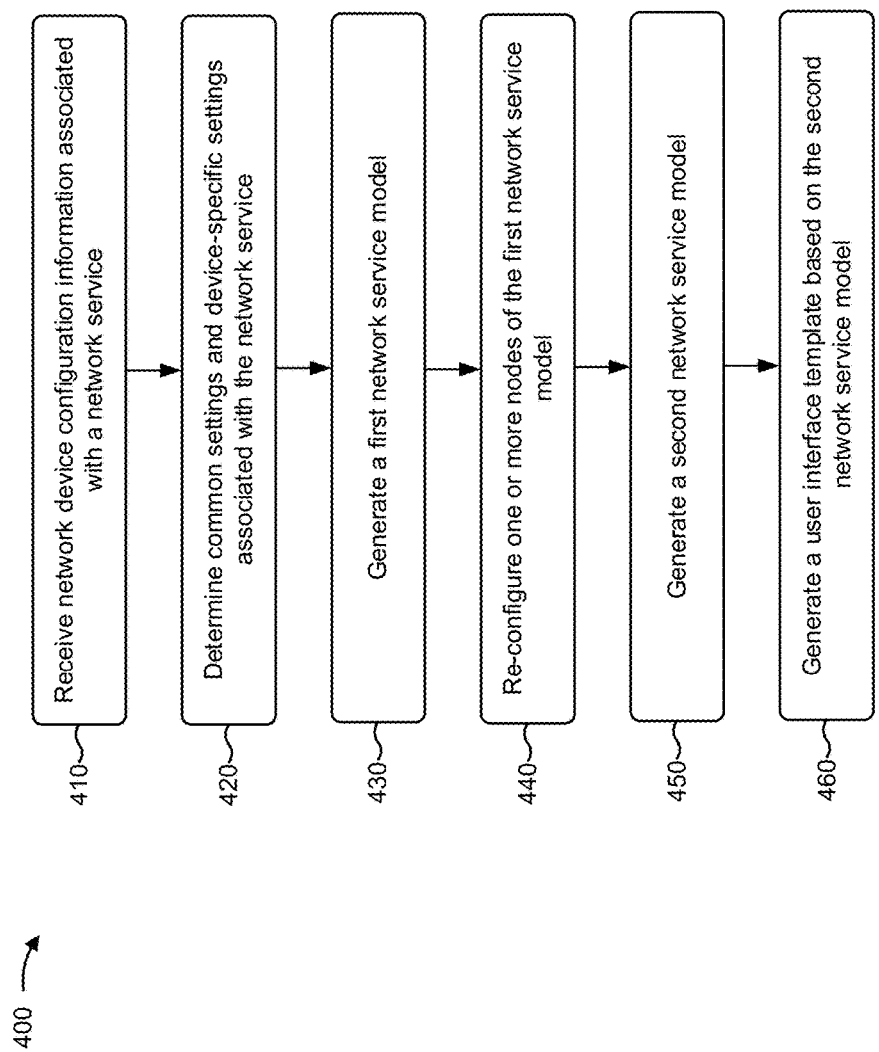
FIG. 4 is a flow chart of an example process for generating a network service model.

FIG. 4 is a flow chart of an example process 400 for generating a network service model. In some implementations, one or more process blocks of FIG. 4 may be performed by management system 220. In some implementations, one or more process blocks of FIG. 4 may be performed by another device or a group of devices separate from or including management system 220, such as client device 210, and/or network device 230.

As shown in FIG. 4, process 400 may include receiving network device configuration information associated with a network service (block 410). For example, management system 220 may receive configuration information, associated with network devices 230, associated with a network service to be modelled for use with a network management system. In some implementations, a network service may include a layer 3 virtual private network (L3VPN) service, a virtual private local area network service (VPLS), a peer-to-peer (P2P) service, an 802.1q virtual local area network (VLAN) service, or the like. In some implementations, network devices 230 may be configured to support the network service. In some implementations, a network management system may enable management system 220 to provision and/or re-configure network devices 230 based on user customization received via client device 210.

In some implementations, configuration information may include one or more command line interface (CLI) commands (e.g., a sequence of CLI commands). Additionally, or alternatively, configuration information may include one or more XML files. In some implementations, management system 220 may generate an XML file based on the received configuration information (e.g., a sequence of CLI commands).

In some implementations, management system 220 may receive the configuration information based on input received from client device 210 and/or from another device. In some implementations, a user may input information identifying the configuration information or a memory location at which the configuration information is stored. Based on the user input, management system 220 may retrieve the configuration information.

In some implementations, management system 220 may identify a device type (e.g., a type of network device 230, such as a customer edge (CE) device, a provider edge (PE) device, a provider (P) device, an integrated access device (IAD), or the like) based on the configuration information. For example, management system 220 may identify a device type based on user input received from client device 210. In some implementations, management system 220 may identify a device schema (e.g., a data model that includes configuration data for the type of network device 230 and/or that lists potential settings of network device 230) based on the configuration information. Additionally, or alternatively, management system 220 may utilize the device schema when mapping a network service model to configuration information associated with network device 230, as described elsewhere herein.

In some implementations, management system 220 may identify a resource (e.g., Internet Protocol (IP) addresses, virtual circuit identifiers (VCIDs), ports, and/or interfaces) based on the configuration information. Additionally, or alternatively, management system 220 may allocate particular resources to the network service (e.g., prevent the resources from being allocated to other network services).

As further shown in FIG. 4, process 400 may include determining common settings and device-specific settings associated with the network service (block 420). For example, management system 220 may determine common settings and device-specific settings associated with the network service based on parsing the configuration information. In some implementations, a common setting may include a setting, associated with the network service, that may include the same value on each network device 230 or a particular group of network devices 230 (e.g., multiple network devices 230 may include the same value for the setting). Additionally, or alternatively, a device-specific setting may include a setting, associated with the network service, that may include different values between network devices 230 (e.g., a first network device 230 and a second network device 230 may include different values for the setting).

In some implementations, management system 220 may determine a common setting and/or a device-specific setting based on an XPath expression. For example, management system 220 may parse configuration information associated with each network device 230 and may determine a common setting based on identifying an XPath that includes a same node value for each network device 230. For example, assume that a first network device 230 (e.g., "Device A") includes the following example configuration information for a network service:

```
<?xml version=1.0 encoding=utf-8?>
<system>
  <filters>
    <filter-name>filter1</filter>
      <bandwidth-limit>10</bandwidth-limit>
      <burst-size-limit>20</burst-size-limit>
  </filters>
  <protocols>
    <l2circuit>
      <interface>
        <interface-name>ge-0/0/1</interface-name>
        <virtual-circuit-id>21</virtual-circuit-id>
        <mtu>250</mtu>
      </interface>
    </l2circuit>
  </protocols>
  <interfaces>
    <interface>
      <interface_name>ge-0/0/5</interface_name>
      <speed>2000</speed>
```

```
        <family-input>
            <name>filter1</name>
        </family-input>
    </interface>
  </interfaces>
</system>
```

Additionally, assume that a second network device 230 (e.g., "Device B") includes the following example configuration information for the network service:

```
<?xml version=1.0 encoding=utf-8?>
<system>
  <filters>
    <filter-name>filter1</filter>
        <bandwidth-limit>10</bandwidth-limit>
        <burst-size-limit>20</burst-size-limit>
  </filters>
  <protocols>
    <l2circuit>
      <interface>
        <interface-name>ge-0/0/2</interface-name>
        <virtual-circuit-id>21</virtual-circuit-id>
        <mtu>250</mtu>
      </interface>
    </l2circuit>
  </protocols>
  <interfaces>
    <interface>
        <interface_name>ge-0/0/3</interface_name>
        <speed>2000</speed>
        <family-input>
            <name>filter1</name>
        </family-input>
    </interface>
  </interfaces>
</system>
```

For example, management system 220 may determine that configuration information associated with the first network device 230 and configuration information associated with the second network device 230 include the following, among others, XPath expressions that include the same node values: "system/filters/bandwidth-limit" and "system/filters/burst-size-limit." For example, the "bandwidth-limit" node includes the value "10," and the "burst-size-limit" node includes the value "20" for each network device 230.

Additionally, or alternatively, management system 220 may determine a device-specific setting based on identifying an XPath that includes different values for each network device 230. For example, management system 220 may determine that configuration information associated with the first network device 230 and configuration information associated with the second network device 230 include the following, among others, XPath expressions that include different node values: "configuration/firewall/policer/policer-name." For example, the first network device 230 includes a node value (e.g., "policer_in_ge-0/0/5_915") associated with a node (e.g., "policer-name") that is different than a node value (e.g., "policer_in_ge-0/0/4_915") associated with the node (e.g., "policer-name") for the second network device 230.

In some implementations, management system 220 may identify common settings based on a device type associated with network device 230. For example, management system 220 may identify common settings that are associated with a first type of network device 230 and may identify common settings that are associated with a second type of network device 230. In this way, management system 220 may map a setting associated with a network service model to configuration associated with network device 230 based on the type of network device 230, as described in more detail elsewhere herein. For example, management system 220 may provision a first type of network device 230 (e.g., a PE device) with a different setting than a second type of network device 230 (e.g., a CE device). In this way, management system 220 may support different network service types (e.g., a "hub and spoke" L3VPN or a "mesh" L3VPN) based on provisioning particular network devices 230.

As further shown in FIG. 4, process 400 may include generating a first network service model (block 430). For example, management system 220 may generate a first network service model (e.g., a YANG model) based on identifying the common settings and the device-specific settings. In some implementations, the first network service model may include one or more container nodes. For example, a container node may represent a node that is used to group related nodes (e.g., one or more child nodes) in the first network service model. In some implementations, the first network service model may include a container node for the common settings, may include a container node for the device-specific settings, and/or may include other container nodes for other settings (e.g., a general settings container node that may be applicable to one or more other network services).

Additionally, or alternatively, the first network service model may include one or more leaf nodes. For example, a leaf node may include a node that may be associated with a value (e.g., a common setting value or a device-specific setting value). Additionally, or alternatively, one or more leaf nodes may be associated with a particular container node (e.g., either the common settings container node or the device-specific settings container node). In this way, management system 220 may group XPaths, associated with common settings, under a container node associated with common settings, and may group XPaths, associated with device-specific settings, under a container node associated with device-specific settings.

For example, management system 220 may generate an example first network service model as shown below:
module: service

```
module:service
+--rw general-settings
|       +--rw service-name?        string
|       +--rw comments?            string
+--rw common-settings
|       +--filters* [filter-name]
|       |       +--rw filter-name            string
|       |       +--rw bandwidth-limit?       string
|       |       +--rw burst-size-limit       string
|       +--rw interfaces
|       |       +--rw-interface
```

```
        |          |                      +--rw speed?           enumeration
        |          |                      +--family-input
        |          |                              +--rw name?       -> /filters/filter-name
        |          +--rw protocols
        |                  +--rw l2circuit!
        |                          +--rw interface!
        |                                  +--rw virtual-circuit-id?    uint32
        |                                  +--rw mtu?                   uint32
+--rw Device A settings
        |          +--rw protocols
        |          |      +--rw l2circuit!
        |          |              +--rw interface!
        |          |                      +--rw interface-name    interface-name
        |          +--rw interfaces
        |                  +--rw interface
        |                          +--rw interface-name?          string
+--rw Device B settings
        |          +--rw protocols
        |          |      +--rw l2circuit!
        |          |              +--rw interface!
        |          |                      +--rw interface-name    interface-name
        |          +--rw interfaces
        |                  +--rw interface
        |                          +--rw interface-name?          string
```

For example, as shown in the example first network service model above, management system 220 may group XPaths associated with common settings under a first container node (e.g., "common-settings"), and may group XPaths associated with device-specific settings under container nodes associated with respective network devices 230 (e.g., "Device A" settings and "Device B" settings).

In some implementations, management system 220 may store information that maps an XPath, associated with the first network service model, to an XPath associated with configuration information associated with network device 230 (e.g., an XML file or a device schema). For example, management system 220 may map an XPath (e.g., "service/common-settings/protocols/l2circuit!/interface/mtu?"), associated with the first network service model, with an XPath (e.g., "system/protocols/l2circuit/interface/mtu") associated with configuration information associated with network device 230. Additionally, or alternatively, management system 220 may store information that maps configuration information associated with network devices 230 to the first network service model. In this way, management system 220 may provision network devices 230 based on a user customization of the network service using a network service model, as described elsewhere herein.

In some implementations, management system 220 may insert an XPath, associated with the first network service model, into configuration information associated with network device 230. For example, management system 220 may generate configuration information (e.g., an XML file) for each network device 230 associated with the network service. Additionally, or alternatively, the configuration information may include XPaths associated with the first network service model. For example, example configuration information for a network device 230 may include an XPath associated with the first network service model: <virtual-circuit-id>{common-settings/protocols/l2circuit/interface/virtual-circuit-id}</virtual-circuit-id>. In this way, a node value, associated with the first network service model, may be mapped to a node value associated with configuration information associated with network device 230.

As further shown in FIG. 4, process 400 may include re-configuring one or more nodes of the first network service model (block 440). For example, management system 220 may re-configure one or more nodes of first network service model based on moving one or more leaf nodes and/or flattening one or more nodes. In some implementations, management system 220 may identify a node (e.g., a referring node) that references another node (e.g., a referenced node), and may move the referenced node. In some implementations, management system 220 may identify a leafref node. For example, a leafref node may include a node that references a particular leaf node.

Additionally, or alternatively, management system 220 may identify nodes associated with string values, and may identify a node that references another node based on determining whether a name associated with the referring node satisfies a threshold similarity to the referenced node. For example, management system 220 may implement a technique (e.g., a Levenshtein-algorithm) to determine whether a Levenshtein distance between a name associated with the referring node and a name associated with the referenced node satisfies a threshold distance (e.g., 0.2).

In some implementations, management system 220 may move a referenced node such that a parent node of the referenced node is a child node to the referring node. For example, as shown in the example first network service model above, management system 220 may identify a referring node (e.g., "name?→/filters/filter-name"), and may add the parent node (e.g., "filters*[filter-name]") of the referenced node (e.g., "filter-name") as a child node to the referring node. In this way, management system 220 may simplify the first network service model by grouping referenced nodes with referring nodes.

In some implementations, management system 220 may re-configure one or more nodes based on flattening a node. For example, management system 220 may identify a parent node associated with the first network service model that includes a child node that is a container node (e.g., does not include a particular value). Additionally, or alternatively, management system 220 may move one or more sub-child nodes of the child node (e.g., the container node) under the parent node, and may remove the child node. Additionally, or alternatively, management system 220 may rename the parent node such that the name of the parent node includes "parent node name-child node name-sub-child node name . . . sub-child node name." Additionally, or alternatively, management system 220 may add a particular suffix to the renamed node in the event of a node name conflict. In this way, management system 220 may generate a second network service model, that is simplified as compared to the first network service model, based on re-configuring one or more nodes, as described below.

As further shown in FIG. 4, process 400 may include generating a second network service model (block 450). For example, management system 220 may generate a second network service model (e.g., a YANG model) based on re-configuring one or more nodes of the first network service model. For example, as shown below, management system 220 may generate an example second network service model based on re-configuring one or more nodes of the first network service model:

```
module:service
+--rw general-settings
|       +--rw service-name?                                      string
|       +--rw comments?                                          string
+--rw common-settings
|       +--rw protocols-l2circuit-interface-virtual-circuit-id?  uint32
|       +--rw protocols-l2cirucit-interface-mtu?                 uint32
|       +--rw interfaces
|               +--rw interface-speed?                           enumeration
|               +--rw interface-family-input-filters-burst-size-limit  string
|               +--rw interface-family-input-filters-bandwidth-limit?  string
+--rw Device A settings
|       +--rw interfaces-interface-name?                         string
|       +--rw protocols-l2circuit-inteface-name                  interface-name
+--rw Device B settings
        +--rw interfaces-interface-name?                         string
        +--rw protocols-l2circuit-interface-name                 interface-name
```

In this way, management system 220 may generate a second network service model that represents a simplified (e.g., fewer settings and/or fewer nodes) version of the first network service model. In some implementations, management system 220 may update stored information that maps an XPath, associated with the first network service model, to an XPath associated with configuration information of network device 230 based on re-configuring one or more nodes of the first network service model. For example, management system 220 may update the stored information such that an XPath, associated with the configuration information, is mapped to an XPath associated with the second network service model. For example, management system 220 may map an XPath (e.g., "system/protocols/l2circuit/interface/mtu"), associated with configuration information of network device 230, with an XPath (e.g., "service/common-settings/protocols-l2circuit!-interface-mtu?") associated with the second network service model.

In some implementations, management system 220 may insert an XPath, specifying a node value, associated with the second network service model into configuration information (e.g., an XML, file) associated with network device 230. For example, configuration information associated with network device 230 may include the following example format: <mtu>{service/common-settings/protocols-l2circuit-interface-mtu}</mtu>. In this way, management system 220 may provision network device 230 based on a user input associated with the second network service model, as described elsewhere herein.

As further shown in FIG. 4, process 400 may include generating a user interface template based on the second network service model (block 460). For example, management system 220 may generate a user interface template, based on the second network service model, for client device 210. For example, a user interface template may specify a particular layout of a user interface, may specify particular user interface elements (e.g., menus, lists, fields, and/or boxes) that are to be provided via the user interface, or the like. In some implementations, client device 210 may receive the user interface template from management system 220 and may provide particular user interface elements for display via a user interface based on the user interface template.

In some implementations, a user may interact with a user interface of client device 210 to configure the network service. For example, the user may input values for particular settings (e.g., common settings and/or device-specific settings). Based on the user interaction via the user interface of client device 210, management system 220 may receive values for particular settings associated with the network service. Additionally, or alternatively, management system 220 may generate configuration information (e.g., XML files) for network devices 230 based on receiving the values for the particular settings associated with the network service.

For example, assume that a user inputs an MTU (maximum transmission unit) value (e.g., "1522") for the network service via a user interface of client device 210 (e.g., via a user interface component associated with "MTU"). In this case, management system 220 may receive the value, and may identify a mapping between an XPath associated with the second network service model and an XPath associated with configuration information of network device 230. For example, management system 220 may identify an XPath (e.g., "service/connectivity-settings/protocols-l2circuit-interface-mtu"), associated with the second network service model, that corresponds to the user interface component. Additionally, or alternatively, management system 220 may identify an XPath (e.g., "system/protocols/l2circuit/interface/mtu") associated with the configuration information of network device 230, and may insert the value (e.g., "1522") into the configuration information associated with network device 230 (e.g., "<mtu>1522</mtu>"). In this way, management system 220 may generate configuration information for network devices 230 based on values received via client device 210.

In some implementations, management system 220 may provision network devices 230 based on the configuration information (e.g., via the NETCONF protocol). For example, management system 220 may receive, from client device 210, a user customization of the network service, and may automatically provision network devices 230 based on the user customization. For example, management system 220 may identify an XPath associated with the user customization (e.g., an XPath associated with the network service model), and may identify a mapping between the XPath and another XPath associated with configuration information associated with network devices 230. In this way, management system 220 may generate configuration information associated with network devices 230 and may automatically provision network devices 230 (e.g., via NETCONF remote procedure calls (RPCs)).

Implementations described herein may enable management system 220 to automatically generate a network service model based on configuration information associated with network devices 230. Additionally, implementations described herein may enable management system 220 to automatically generate configuration information associated with network devices 230. In this way, a user may configure a network service via a user interface of client device 210, and may provision network devices 230 based on the automatically generated network service model. Implementations described herein may reduce a quantity of errors associated with modeling a network service and may additionally reduce a quantity of computing time associated with configuring a network service. Thereby, implementations described herein may conserve processor and/or memory resources associated with client device 210 and/or management system 220 and may additionally conserve network resources.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
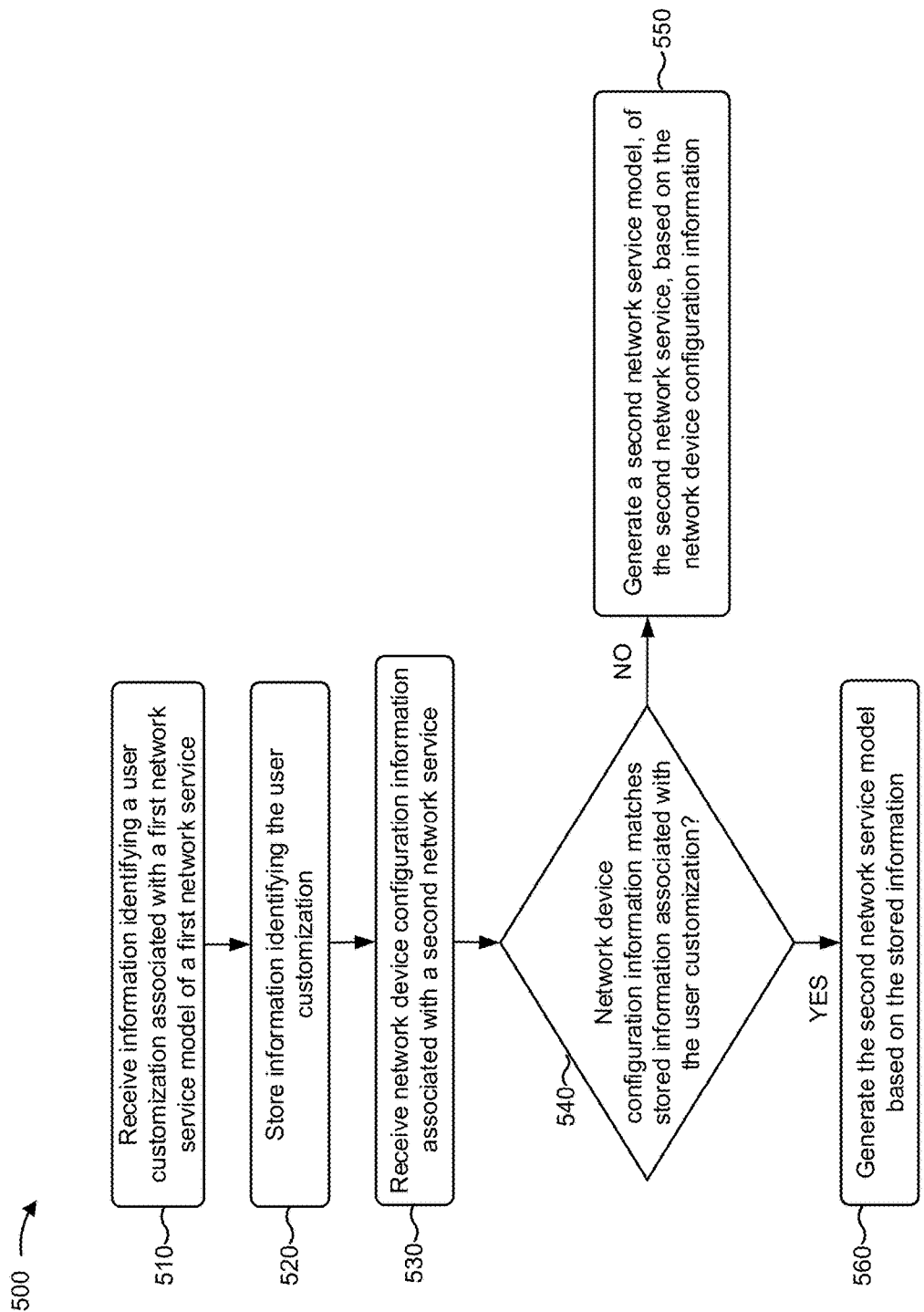
FIG. 5 is a flow chart of an example process for generating a network service model based on a user customization.

FIG. 5 is a flow chart of an example process 500 for generating a network service model based on a user customization. In some implementations, one or more process blocks of FIG. 5 may be performed by management system 220. In some implementations, one or more process blocks of FIG. 5 may be performed by another device or a group of devices separate from or including management system 220, such as client device 210, and/or network device 230.

As shown in FIG. 5, process 500 may include receiving information identifying a user customization associated with a first network service model of a first network service (block 510), and storing information identifying the user customization (block 520). For example, management system 220 may receive information identifying a user customization associated with a network service model based on a user input via client device 210. In some implementations, management system 220 may receive information identifying a user customization of a network service model, a user customization of a user interface (e.g., based on the user interface template as described above in connection with FIG. 4), or the like. In some implementations, a user customization may refer to a user configuration of a generated network service model, as described below.

In some implementations, management system 220 may store information identifying the user customization, and may generate another network service model based on the stored information, as described elsewhere herein. For example, management system 220 may store information that associates an XPath (e.g., an XPath associated with configuration information) with the user customization. In this way, management system 220 may receive additional configuration information, for modelling another network service, and may generate a network service model for the other network service based on the user customization(s), as described elsewhere herein.

In some implementations, management system 220 may receive information identifying a user customization of a label associated with a setting. For example, assume that client device 210 provides a user interface for display that allows a user to configure the network service. Additionally, assume that the user interface provides a label associated with a setting associated with the network service model (e.g., "common-settings/protocols/l2circuit/interface/virtual-circuit-id"). In this case, a user may configure the label to "VCID." In this way, management system 220 may receive information identifying a user customization, and may provide a simplified user interface template for display (e.g., via client device 210).

In some implementations, management system 220 may receive information identifying a user customization, and may prevent one or more settings associated with the network service model from being displayed in a user interface. For example, assume that the network service model includes four configurable settings (e.g., "Setting A," "Setting B," "Setting C," and "Setting D") associated with the network service. Additionally, assume that client device 210 provides a user interface for display that allows a user to configure the four settings based on the network service model. In some implementations, a user may interact with client device 210 and may configure the network service model such that a particular setting is associated with a particular value (e.g., "Setting A" is associated with the value "70"). Additionally, or alternatively, the user may interact with client device 210 to remove a user interface component (e.g., a field) associated with the particular setting (e.g., "Setting A"). In this way, client device 210 may provide a user interface that allows a user to configure the other three settings (e.g., "Setting B," "Setting C," and "Setting D"). In this way, management system 220 may provide a simplified user interface template to client device 210 based on a user customization.

In some implementations, management system 220 may receive information identifying a user customization, and may associate one or more settings. For example, management system 220 may associate one or more settings with a particular container node associated with a network service model. In some implementations, a user may interact with client device 210 to associate one or more settings with a particular container node. For example, a user may configure the network service model to include particular XPaths under a particular container node. For example, the user may configure the network service model to include a first XPath (e.g., "ethernet-switching-options/secure-access-port/interface") and a second XPath (e.g., "ethernet-switching-options/secure-access-port/interface/mac-limit") under a particular container node (e.g., a container node labelled "port security"). In this way, management system 220 may provide a user interface template that associates particular settings.

In some implementations, management system 220 may receive information identifying a user customization that maps one or more settings to a particular designation. For example, assume that the network service model includes a configurable buffer-size setting and a configurable transmit-rate setting. Additionally, assume that the network service model may allow a user to configure particular numeric values for each setting. In some implementations, a user may configure the network service model such that the bandwidth setting and the transmit rate setting are associated with a designation (e.g., "traffic priority"). Additionally, or alternatively, the user may configure the designation to include particular values (e.g., "high," "medium," and "low"). Additionally, or alternatively, management system 220 may map a value associated with the designation to one or more values associated with the corresponding settings based on a user customization. For example, management system 220 may map a value (e.g., "high") associated with the designation (e.g., "traffic priority") to a value (e.g., "60") associated with the buffer-size setting and another value (e.g., "70") associated with the transmit-rate setting.

In some implementations, management system 220 may receive a user customization that moves a particular setting to another node. For example, assume that the network service model includes a particular setting node under a common settings container node. However, assume that the particular setting is a device-specific setting. In this case, a user may configure the model to include the particular setting under the device-specific settings container node.

In some implementations, management system 220 may store information that identifies the user customization(s), and may use a machine learning technique (e.g., an artificial neural network (ANN) machine learning technique) based on the user customization(s). For example, management system 220 may generate a network service model, may receive user customizations of the generated network service model, and may generate other network service models based on the user customizations of the generated service model. In this way, a user may interact with a user interface of client device 210 to configure the user interface and/or the network service model. Additionally, management system 220 may store information that identifies the user customization(s), and may generate other network service models based on the stored information.

As further shown in FIG. 5, process 500 may include receiving network device configuration information associated with a second network service (block 530), and determining whether the network device configuration information matches stored information associated with the user customization (block 540). In some implementations, management system 220 may receive configuration information of network devices 230 to model a second network service. For example, management system 220 may receive configuration information associated with network devices 230 in a similar manner as described above in connection with block 410 of FIG. 4. In some implementations, management system 220 may parse the received configuration information (e.g., XML files) and may determine whether one or more XPaths associated with the received configuration information match an XPath associated with stored information. In this way, management system 220 may generate a network service model based on stored information (e.g., information that identifies the user customization(s)).

As further shown in FIG. 5, if the network device configuration information does not match stored information associated with the user customization (block 540—NO), then process 500 may include generating a second network service model, of the second network service, based on the network device configuration information (block 550). For example, management system 220 may generate a second network service model based on configuration information associated with network devices 230 in a similar manner as described above in connection with blocks 410-460 of FIG. 4.

As further shown in FIG. 5, if the network device configuration information does match stored information associated with the user customization (block 540—YES), then process 500 may include generating the second network service model based on the stored information (block 560). For example, management system 220 may generate the second network service model based on the stored information that identifies the user customization and based on configuration information associated with network devices 230. In some implementations, management system 220 may identify an XPath associated with configuration information associated with network device 230, and may identify a corresponding XPath associated with the stored information that identifies the user customization. In this way, management system 220 may generate the second network service model to reflect previous user customizations. In this way, management system 220 may reduce a quantity of additional user customizations of the second network service model, thereby conserving processor and/or memory resources of client device 210 and/or management system 220.

In some implementations, management system 220 may generate the second network service model to include a particular value for a particular setting based on a user customization. For example, assume that a user configured a particular setting associated with the first network service model to include a particular value, and removed the particular setting from being displayed via a user interface of client device 210. In some implementations, management system 220 may identify an XPath associated with the particular setting, and may assign the particular value to the particular setting. Additionally, management system 220 may generate a user interface template associated with the second network service model such that the particular setting is not provided for display. In this way, management system 220 may reduce a quantity of repetitive configuration of network services, thereby conserving processor and/or memory resources and/or network resources.

In some implementations, management system 220 may generate the second network service model to include a particular label for a particular setting. For example, assume that a user configured a label (e.g., "common-settings/protocols/l2circuit/interface/virtual-circuit-id") of a particular setting to a different label name (e.g., "VCID"). In this case, management system 220 may identify an XPath associated with the particular setting and may generate the second network service model to include the label. In this way, management system 220 may generate a user interface template associated with the second network service model that includes the label associated with the particular setting.

In some implementations, management system 220 may generate the second network service model to associate particular settings with a particular container and/or a particular designation. For example, assume that a user configured the first network service model to associate particular settings (e.g., a buffer-size setting and a transmit-rate setting) to a particular designation (e.g., "traffic priority"). Additionally, assume that the user configured values associated with the designation (e.g., "high," "medium," and "low") to map to particular values associated with the particular settings. In this case, management system 220 may identify) (Paths associated with the particular settings and may generate the second network service model to associate the particular designation with the particular settings. Additionally, management system 220 may generate a user interface template associated with the second network service model such that a user interface associated with client device 210 provides values associated with the particular designation for display. In this way, management system 220 may simplify the second network service model based on a user customization of the first network service model, and may simplify configuration of the network service, thereby conserving processor and/or memory resources of client device 210 and/or management system 220.

In this way, management system 220 may generate a second network service model for a network service based on a user customization of a first network service model for another service. Additionally, management system 220 may reduce a quantity of repetitive configuration of network service models, thereby conserving processor and/or memory resources of client device 210 and/or management system 220.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6A:
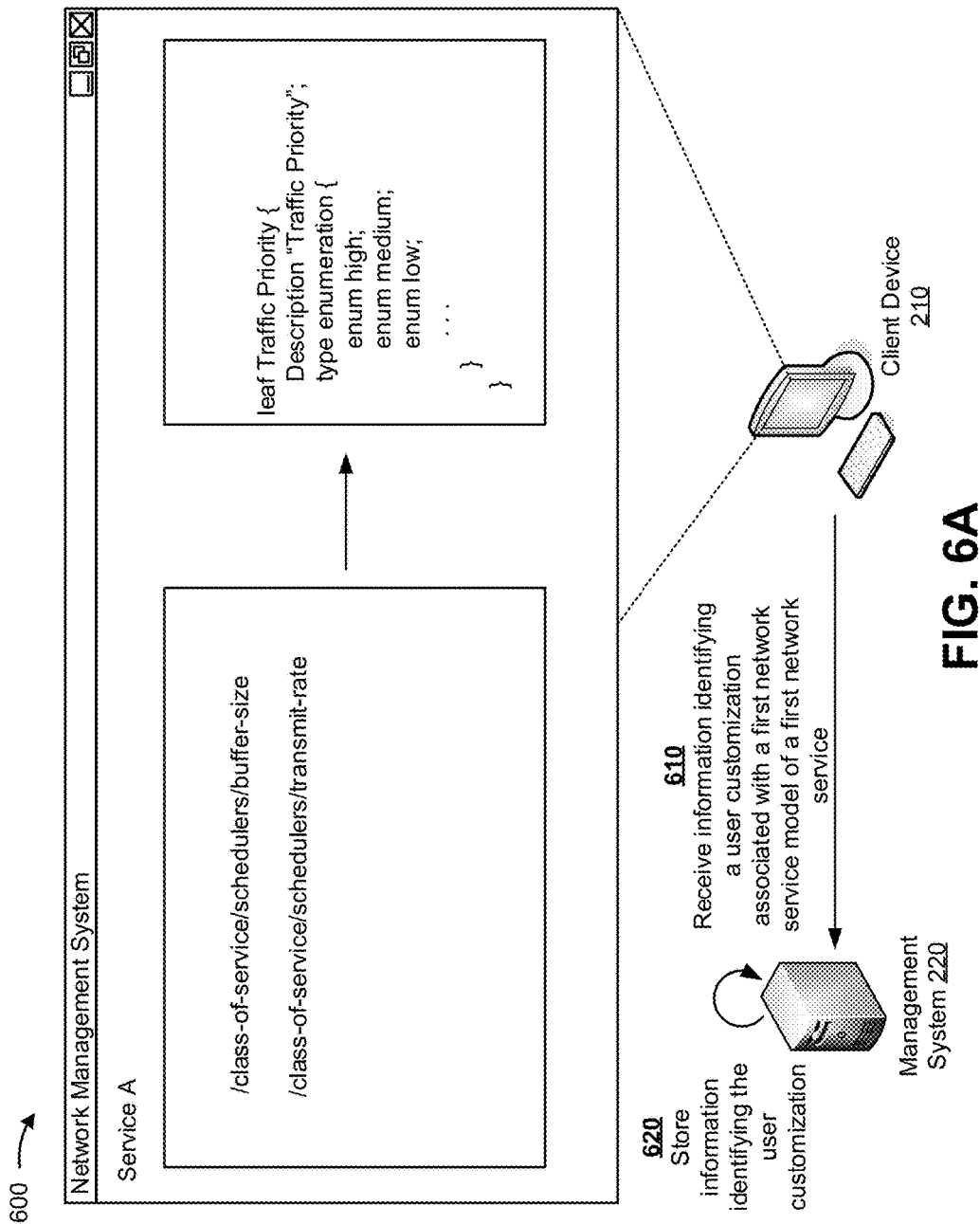
Figure 6C:
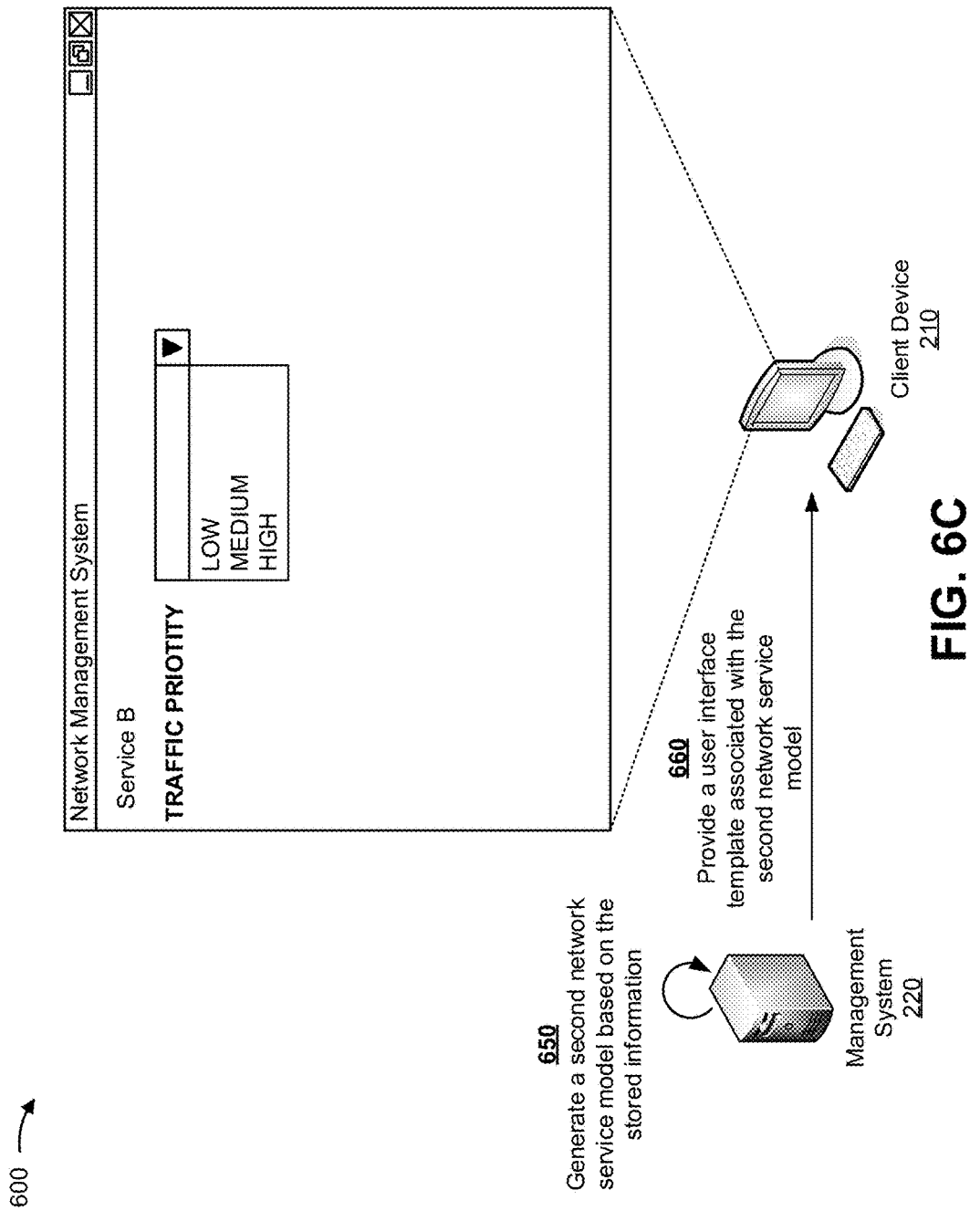

FIGS. 6A-6C are diagrams of an example implementation 600 relating to example process 500 shown in FIG. 5. FIGS. 6A-6C show an example of generating a network service model based on a user customization.

As shown in FIG. 6A, and by reference number 610, management system 220 may receive information identifying a user customization associated with a first network service model of a first network service. For example, assume that the first network service model is associated with a first network service (e.g., "Service A"). As shown, assume that a user configures (e.g., via client device 210) the first network service model such that particular settings (e.g., a buffer-size setting and a transmit-rate setting) are associated with a particular designation (e.g., "traffic priority"). As shown by reference number 620, management system 220 may store information identifying the user customization. For example, management system 220 may store information that associates XPaths associated with the particular settings (e.g., "/class-of-service/schedulers/buffer-size" and "/class-of-service/schedulers/transmit-rate") with instructions (e.g., XML code) associated with the particular designation (e.g., "Traffic Priority").

As shown in FIG. 6B, and by reference number 630, management system 220 may receive configuration information, associated with network devices 230, associated with a second network service. For example, assume that a user is inputting configuration information associated with network devices 230 for management system 220 to generate a network service model associated with a second network service (e.g., "Service B"). As shown by reference number 640, management system 220 may determine that configuration information associated with network devices 230 matches stored information associated with the user customization associated with the first network service model. For example, assume that management system 220 identifies the XPaths (e.g., "/class-of-service/schedulers/buffer-size" and "/class-of-service/schedulers/transmit-rate") based on parsing configuration information associated with network devices 230.

As shown in FIG. 6C, and by reference number 650, management system 220 may generate a second network service model based on the stored information. For example, management system 220 may generate the second network service model such that particular settings (e.g., a buffer-size setting and a transmit-rate setting) are associated with a particular designation (e.g., "traffic priority"). As shown by reference number 660, management system 220 may provide a user interface template associated with the second network service model to client device 210. In this way, client device 210 may provide a user interface for display that allows a user to configure the particular settings (e.g., the buffer-size setting and the transmit-rate setting) by selecting a particular value (e.g., "high," "medium," of "low") associated with a designation (e.g., "Traffic Priority").

In this way, management system 220 may simplify the network service configuration process, thereby conserving processor and/or memory resources associated with client device 210 and/or management system 220.

As indicated above, FIGS. 6A-6C are provided merely as an example. Other examples are possible and may differ from what was described with regard to FIGS. 6A-6C Implementations described herein may enable a management system to generate a network service model based on network device configuration information. Additionally, implementations described herein may enable the management system to generate the network service model and generate network device configuration information (e.g., code to provision the network devices) without requiring that a user generate code. In this way, the management system may reduce a quantity of errors associated with modelling a network service, and reduce a quantity of errors associated with provisioning network devices. Additionally, implementations described herein may reduce a quantity of computing time necessary to configure a network service. In this way, implementations described herein may conserve processor and/or memory resources of a client device and the management system, and may conserve network resources.

While implementations described herein describe particular modelling languages as being used to generate the network service models and/or provision network devices, it should be understood that other modelling languages may be used.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

Certain user interfaces have been described herein and/or shown in the figures. A user interface may include a graphical user interface, a non-graphical user interface, a text-based user interface, etc. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A system, comprising:
one or more processors to:
receive network device configuration information associated with a network service;
determine multiple settings associated with the network service based on receiving the network device configuration information,
the multiple settings including a common setting and a device-specific setting;
generate a first network service model of the network service based on the multiple settings,
the first network service model including multiple nodes corresponding to the multiple settings,
each node in the multiple nodes being associated with a name, and
the multiple nodes including:
a first parent node for the common setting, and a second parent node for the device-specific setting;
re-configure one or more nodes associated with the first network service model by:
renaming the first parent node or the second parent node to include data identifying a child node included in the multiple nodes, and
removing the child node from the first network service model;
generate a second network service model of the network service based on re-configuring the one or more nodes;
generate a user interface template based on the second network service model; and
provide the user interface template to a client device for display,
the client device to allow a configuration of the multiple settings based on the user interface template.

2. The system of claim 1, where the one or more processors are further to:
identify a resource associated with the network service; and
allocate the resource to the network service.

3. The system of claim 1, where the one or more processors are further to:
receive information identifying a user customization of the second network service model;
store information identifying the user customization;
receive network device configuration information associated with another network service; and
generate a third network service model of the other network service based on the information identifying the user customization.

4. The system of claim 1, where the one or more processors are further to:
receive information identifying a user customization of the second network service model;
implement a machine learning technique based on the information identifying the user customization; and
generate a third network service model of another network service based on implementing the machine learning technique.

5. The system of claim 1, where the one or more processors are further to:
identify a referenced node; and
identify, in the first network service model, a parent node of the referenced node as a referring node,
the referring node referencing the referenced node; and
where the one or more processors, when re-configuring the one or more nodes, are to:
re-configure the one or more nodes based on moving the parent node of the referenced node the referring node.

6. The system of claim 1, where the one or more processors are further to:
identify a third parent node that includes a second child node that is a container node;
move a sub-child node of the third parent node under the third parent node;
remove the second child node; and
where the one or more processors, when re-configuring the one or more nodes, are to:
re-configure the one or more nodes based on removing the second child node.

7. The system of claim 1, where the one or more processors are further to:
provision one or more network devices based on the second network service model.

8. A non-transitory computer-readable medium storing instructions, the instructions comprising:
one or more instructions that, when executed by one or more processors, cause the one or more processors to:
receive network device configuration information associated with a network service;
determine multiple settings based on the network device configuration information,
the multiple settings including device-specific settings and common settings;

generate a first network service model based on determining the multiple settings,
    the first network service model including multiple nodes corresponding to the multiple settings,
        each node in the multiple nodes being associated with a name, and
        the multiple nodes including:
            a first parent node for the common settings, and
            a second parent node for the device-specific settings;
generate a second network service model based on re-configuring one or more nodes of the multiple nodes of the first network service model,
    the one or more nodes being re-configured by:
        renaming the first parent node or the second parent node to include data identifying a child node included in the multiple nodes, and
        removing the child node from the first network service model;
generate a user interface template based on the second network service model; and
provide the user interface template.

9. The non-transitory computer-readable medium of claim 8, where the one or more instructions, when executed by the one or more processors, further cause the one or more processors to:
receive information identifying a user customization of the second network service model; and
prevent one or more settings, of the multiple settings, from being displayed in a user interface based on the information identifying the user customization.

10. The non-transitory computer-readable medium of claim 8, where the one or more instructions, when executed by the one or more processors, further cause the one or more processors to:
map an extensible markup language path expression associated with the second network service model to another extensible markup language path expression associated with the network device configuration information.

11. The non-transitory computer-readable medium of claim 8, where the network device configuration information includes first configuration information associated with a first network device and second configuration information associated with a second network device; and
where the one or more instructions, that cause the one or more processors to determine the multiple settings, cause the one or more processors to:
determine first settings, of the multiple settings, that include same values in the first configuration information and the second configuration information,
    the first settings being associated with the common settings; and
determine second settings, of the multiple settings, that include different values in the first configuration information than in the second configuration information,
    the second settings being associated with the device-specific settings.

12. The non-transitory computer-readable medium of claim 8, where the network device configuration information includes one or more command line interface commands.

13. The non-transitory computer-readable medium of claim 8, where the one or more instructions, when executed by the one or more processors, further cause the one or more processors to:
provision multiple network devices based on the second network service model,
    each of the multiple network devices being provisioned with same values associated with the common settings.

14. The non-transitory computer-readable medium of claim 8, where the one or more instructions, when executed by the one or more processors, further cause the one or more processors to:
identify a resource based on receiving the network device configuration information; and
allocate the resource to the network service.

15. A method, comprising:
receiving, by a system, configuration information associated with a network service;
determining, by the system, multiple settings based on the configuration information,
    the multiple settings including common settings that are common for a plurality of network devices, and device-specific settings that differ for one or more of the plurality of network devices;
generating, by the system, a first network service model based on determining the multiple settings,
    the first network service model including multiple nodes corresponding to the multiple settings,
        each node in the multiple nodes being associated with a name, and
        the multiple nodes including:
            a first parent node for the common settings, and
            a second parent node for the device-specific settings;
generating, by the system, a second network service model based on re-configuring one or more nodes of the multiple nodes,
    the one or more nodes being re-configured by:
        renaming the first parent node or the second parent node to include data identifying a child node included in the multiple nodes, and
        removing the child node from the first network service model;
generating, by the system, a user interface template based on the second network service model; and
providing, by the system, the user interface template to allow a configuration of the multiple settings based on the user interface template.

16. The method of claim 15, further comprising:
receiving information identifying a user customization of the second network service model; and
mapping one or more settings, of the multiple settings, to a designation based on receiving the information identifying the user customization.

17. The method of claim 15, further comprising:
provisioning multiple network devices based on the second network service model,
    each of the multiple network devices to be provisioned with same values associated with the common settings.

18. The method of claim 15, further comprising:
mapping the configuration information to the second network service model.

19. The method of claim 15, further comprising:
identifying one or more device types based on the configuration information; and
where determining the multiple settings comprises:
    determining the multiple settings based on the one or more device types.

20. The method of claim 15, further comprising:
receiving information identifying multiple values associated with the multiple settings; and provisioning multiple network devices based on receiving the information identifying the multiple values.

\* \* \* \* \*